(12) United States Patent
Bajpai (10) Patent No.: US 10,755,110 B2
(45) Date of Patent: Aug. 25, 2020

(54) TRAILERING ASSIST SYSTEM FOR VEHICLE

(71) Applicant: MAGNA ELECTRONICS INC., Auburn Hills, MI (US)

(72) Inventor: Devendra Bajpai, Bloomfield Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 704 days.

(21) Appl. No.: 14/316,939

(22) Filed: Jun. 27, 2014

(65) Prior Publication Data

US 2015/0002670 A1    Jan. 1, 2015

Related U.S. Application Data (60) Provisional application No. 61/840,542, filed on Jun. 28, 2013.

(51) Int. Cl.
*G06K 9/00* (2006.01)
*B60R 1/00* (2006.01)

(52) U.S. Cl.
CPC ............ *G06K 9/00791* (2013.01); *B60R 1/00* (2013.01); *B60R 2300/304* (2013.01); *B60R 2300/806* (2013.01)

(58) Field of Classification Search
CPC .................................................. B62D 15/025
See application file for complete search history.

(56) References Cited

U.S. PATENT DOCUMENTS

| 5,355,118 A | 10/1994 | Fukuhara |
| 5,426,294 A | 6/1995 | Kobayashi et al. |
| 5,444,478 A | 8/1995 | Lelong et al. |
| 5,530,420 A | 6/1996 | Tsuchiya et al. |
| 5,550,677 A | 8/1996 | Schofield et al. |
| 5,555,312 A | 9/1996 | Shima et al. |
| 5,670,935 A | 9/1997 | Schofield et al. |
| 5,675,489 A | 10/1997 | Pomerleau |
| 5,724,316 A | 3/1998 | Brunts |
| 5,757,949 A | 5/1998 | Kinoshita et al. |
| 5,760,828 A | 6/1998 | Cortes |
| 5,760,962 A | 6/1998 | Schofield et al. |
| 5,765,116 A | 6/1998 | Wilson-Jones et al. |
| 5,781,437 A | 7/1998 | Wiemer et al. |
| 5,786,772 A | 7/1998 | Schofield et al. |

(Continued)

*Primary Examiner* — Jamie J Atala
*Assistant Examiner* — Hesham K Abouzahra
(74) *Attorney, Agent, or Firm* — Honigman LLP (57) ABSTRACT

A trailering assist system for a vehicle includes a camera disposed at a vehicle, with the camera having a field of view rearward of the vehicle that encompasses a trailer that is being towed by the vehicle. The camera is operable to capture image data. A control of the system includes an image processor operable to process captured image data. Responsive to input of vehicle parameters and processing of captured image data by the image processor, the trailering assist system is operable to determine an estimated trailer angle and an estimated vehicle steering wheel angle. The control compares the estimated vehicle steering wheel angle to a measured or determined or actual vehicle steering wheel angle to determine an error value. The control is operable to generate an output when the error value is at or above a threshold level.

20 Claims, 4 Drawing Sheets

(56) References Cited

U.S. PATENT DOCUMENTS

| | | | |
|---|---|---|---|
| 5,790,403 | A | 8/1998 | Nakayama |
| 5,790,973 | A | 8/1998 | Blaker et al. |
| 5,793,308 | A | 8/1998 | Rosinski et al. |
| 5,796,094 | A | 8/1998 | Schofield et al. |
| 5,837,994 | A | 11/1998 | Stam et al. |
| 5,845,000 | A | 12/1998 | Breed et al. |
| 5,848,802 | A | 12/1998 | Breed et al. |
| 5,850,176 | A | 12/1998 | Kinoshita et al. |
| 5,850,254 | A | 12/1998 | Takano et al. |
| 5,867,591 | A | 2/1999 | Onda |
| 5,877,897 | A | 3/1999 | Schofield et al. |
| 5,883,739 | A | 3/1999 | Ashihara et al. |
| 5,884,212 | A | 3/1999 | Lion |
| 5,890,021 | A | 3/1999 | Onoda |
| 5,959,555 | A | 9/1999 | Furuta |
| 5,963,247 | A | 10/1999 | Banitt |
| 5,964,822 | A | 10/1999 | Alland et al. |
| 6,175,300 | B1 | 1/2001 | Kendrick |
| 6,266,442 | B1 | 7/2001 | Laumeyer et al. |
| 6,285,393 | B1 | 9/2001 | Shimoura et al. |
| 6,317,057 | B1 | 11/2001 | Lee |
| 6,333,759 | B1 | 12/2001 | Mazzilli |
| 6,370,329 | B1 | 4/2002 | Teuchert |
| 6,430,303 | B1 | 8/2002 | Naoi et al. |
| 6,477,464 | B2 | 11/2002 | McCarthy et al. |
| 6,480,104 | B1 | 11/2002 | Wall et al. |
| 6,483,429 | B1 | 11/2002 | Yasui et al. |
| 6,553,130 | B1 | 4/2003 | Lemelson et al. |
| 6,559,761 | B1 | 5/2003 | Miller et al. |
| 6,578,017 | B1 | 6/2003 | Ebersole et al. |
| 6,594,583 | B2 | 7/2003 | Ogura et al. |
| 6,636,258 | B2 | 10/2003 | Strumolo |
| 6,678,614 | B2 | 1/2004 | McCarthy et al. |
| 6,690,268 | B2 | 2/2004 | Schofield et al. |
| 6,703,925 | B2 | 3/2004 | Steffel |
| 6,704,621 | B1 | 3/2004 | Stein et al. |
| 6,721,659 | B2 | 4/2004 | Stopczynski |
| 6,744,353 | B2 | 6/2004 | Sjönell |
| 6,823,241 | B2 | 11/2004 | Shirato et al. |
| 6,824,281 | B2 | 11/2004 | Schofield et al. |
| 6,889,161 | B2 | 5/2005 | Winner et al. |
| 7,004,593 | B2 | 2/2006 | Weller et al. |
| 7,004,606 | B2 | 2/2006 | Schofield |
| 7,005,974 | B2 | 2/2006 | McMahon et al. |
| 7,006,127 | B2 | 2/2006 | Mizusawa et al. |
| 7,038,577 | B2 | 5/2006 | Pawlicki et al. |
| 7,085,637 | B2 | 8/2006 | Breed et al. |
| 7,092,548 | B2 | 8/2006 | Laumeyer et al. |
| 7,133,661 | B2 | 11/2006 | Hatae et al. |
| 7,158,015 | B2 | 1/2007 | Rao et al. |
| 7,167,796 | B2 | 1/2007 | Taylor et al. |
| 7,195,381 | B2 | 3/2007 | Lynam et al. |
| 7,202,776 | B2 | 4/2007 | Breed |
| 7,227,611 | B2 | 6/2007 | Hull et al. |
| 7,375,803 | B1 | 5/2008 | Bamji |
| 7,483,058 | B1 | 1/2009 | Frank et al. |
| 7,633,383 | B2 | 12/2009 | Dunsmoir et al. |
| 7,676,087 | B2 | 3/2010 | Dhua et al. |
| 7,690,737 | B2 | 4/2010 | Lu |
| 7,720,580 | B2 | 5/2010 | Higgins-Luthman |
| 7,843,451 | B2 | 11/2010 | Lafon |
| 8,010,252 | B2 | 8/2011 | Getman et al. |
| 8,038,166 | B1 | 10/2011 | Piesinger |
| 8,063,752 | B2 | 11/2011 | Oleg |
| 8,138,899 | B2 | 3/2012 | Ghneim |
| 8,164,628 | B2 | 4/2012 | Stein et al. |
| 8,218,007 | B2 | 7/2012 | Lee et al. |
| 8,224,031 | B2 | 7/2012 | Saito |
| 8,260,518 | B2 | 9/2012 | Englert et al. |
| 8,451,107 | B2 | 5/2013 | Lu et al. |
| 9,085,261 | B2 | 7/2015 | Lu et al. |
| 2007/0154068 | A1 | 7/2007 | Stein |
| 2008/0053740 | A1* | 3/2008 | Hublart .......... B62D 3/14 180/406 |
| 2008/0162000 | A1* | 7/2008 | Dattilo .......... B62D 6/008 701/42 |
| 2008/0180526 | A1 | 7/2008 | Trevino |
| 2008/0231701 | A1* | 9/2008 | Greenwood .......... G06T 7/20 348/148 |
| 2009/0079828 | A1 | 3/2009 | Lee |
| 2009/0143967 | A1 | 6/2009 | Lee |
| 2009/0236825 | A1 | 9/2009 | Okuda |
| 2010/0014770 | A1 | 1/2010 | Huggett et al. |
| 2010/0085170 | A1 | 4/2010 | Oleg |
| 2010/0110189 | A1 | 5/2010 | Kuboyama et al. |
| 2010/0324770 | A1 | 12/2010 | Ramsey et al. |
| 2011/0050903 | A1 | 3/2011 | Vorobiev |
| 2012/0045112 | A1 | 2/2012 | Lundblad et al. |
| 2012/0265416 | A1 | 10/2012 | Lu et al. |
| 2014/0085472 | A1 | 3/2014 | Lu et al. |
| 2014/0136052 | A1* | 5/2014 | Kossira .......... B60D 1/245 701/41 |
| 2014/0160276 | A1 | 6/2014 | Pliefke et al. |
| 2014/0200759 | A1 | 7/2014 | Lu et al. |
| 2014/0218506 | A1 | 8/2014 | Trombley et al. |
| 2014/0303847 | A1* | 10/2014 | Lavoie .......... B62D 13/06 701/41 |
| 2015/0002670 | A1 | 1/2015 | Bajpai |
| 2015/0217693 | A1 | 8/2015 | Pliefke et al. |

\* cited by examiner

| | |
|---|---|
| V | = Vehicle Velocity |
| φ | = Steering Angle/Wheel Angle |
| $\theta_1$ | = Vehicle Heading. |
| $\theta_2$ | = Trailer Heading. |
| ε | = Trailer Angle w.r.t. Vehicle. |
| L | = Length Front Axle to Rear Axle |
| L1 | = Length Rear Axle to Hitch Point. |
| L2 | = Length Hitch Point to Trailer Rear Axle. |

TRAILERING ASSIST SYSTEM FOR VEHICLE

CROSS REFERENCE TO RELATED APPLICATION

The present application claims the filing benefits of U.S. provisional application Ser. No. 61/840,542, filed Jun. 28, 2013, which is hereby incorporated herein by reference in its entirety.

FIELD OF THE INVENTION

The present invention relates generally to rear vision systems for vehicles and, more particularly, to rear vision systems having a rearward facing camera at a rear portion of a vehicle.

BACKGROUND OF THE INVENTION

Rear backup cameras and vision systems are known for use in vehicles. Examples of such systems are described in U.S. Pat. Nos. 7,859,565; 6,611,202; 6,222,447; 5,949,331; 5,670,935 and/or 5,550,677, which are hereby incorporated herein by reference in their entireties. Such systems may display images for viewing by the driver of the vehicle that provide a view rearward of the vehicle.

SUMMARY OF THE INVENTION

The present invention provides a trailer angle prediction system or trailering assist system for a vehicle that includes at least one camera disposed at a vehicle and having an exterior field of view rearward of the vehicle. The camera is operable to capture image data. A control includes an image processor operable to process captured image data. The control of the trailering assist system is operable, such as in response to image processing and/or one or more trailer/vehicle parameters, to determine a trailer angle of a trailer that is towed by the vehicle, and the control of the trailering assist system may be operable to determine a path of the trailer responsive to a steering angle of the vehicle. The control of the trailering assist system may predict the steering wheel angle of the vehicle (based on the determined trailer angle and other trailer/vehicle parameters) and compare that with the measured or determined or actual steering wheel angle to determine an error or offset. The trailering assist system may correct for the offset to enhance the trailer angle determination and/or to enhance reversing of the vehicle and trailer along a selected or appropriate rearward path. The trailering assist system may be operable to display information for viewing by the driver to assist the driver in driving the vehicle with the trailer, and may display the predicted path that the trailer and vehicle are traveling along and/or the appropriate path to reverse the trailer to a selected location or parking area.

These and other objects, advantages, purposes and features of the present invention will become apparent upon review of the following specification in conjunction with the drawings.

DESCRIPTION OF THE PREFERRED EMBODIMENTS

Figure 1:
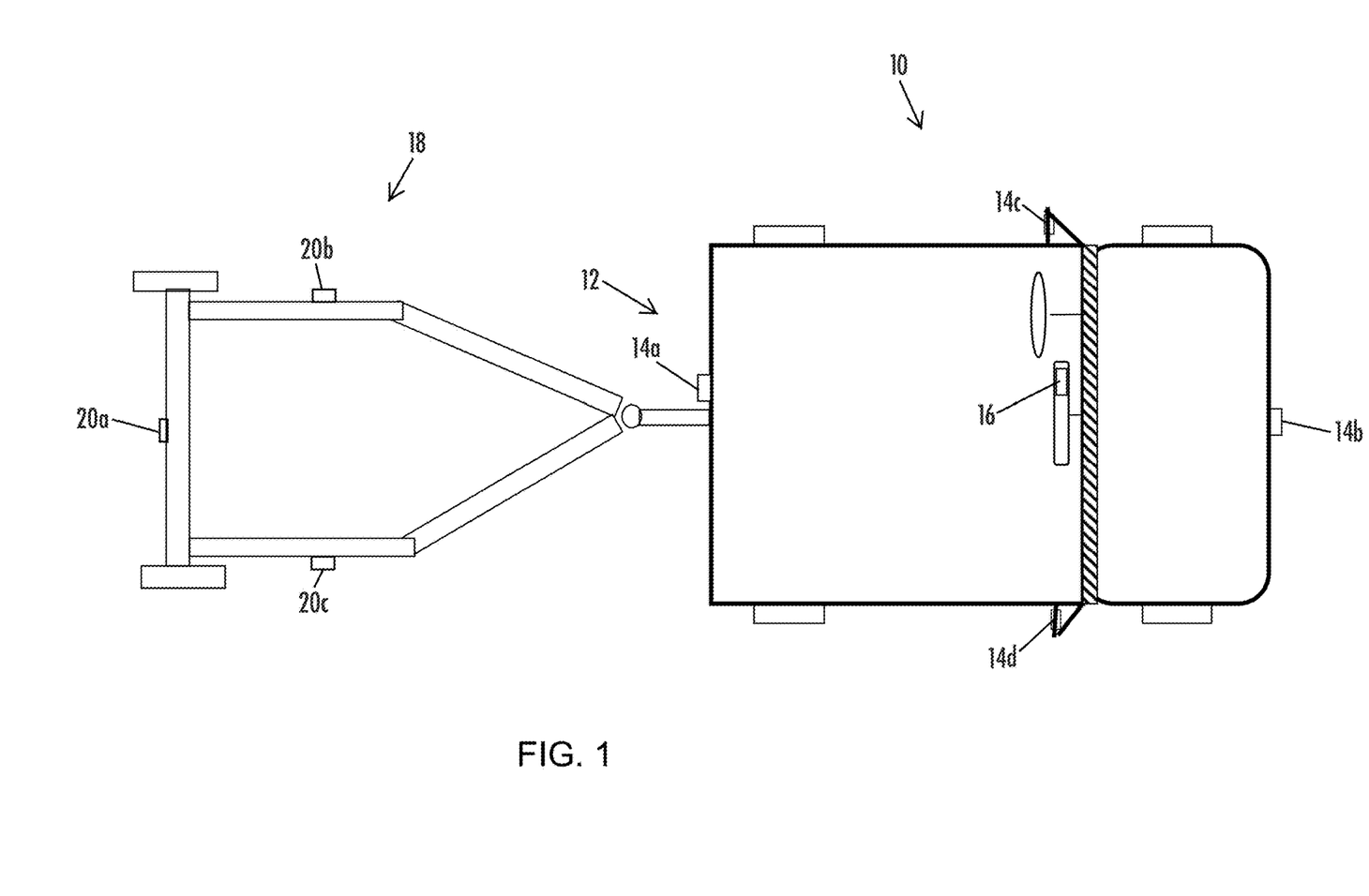
FIG. 1 is a plan view of a vehicle equipped with the rear vision system and trailer detection system of the present invention, shown towing a trailer.

Referring now to the drawings and the illustrative embodiments depicted therein, a vehicle 10 includes an imaging system or vision system 12 that includes one or more imaging sensors or cameras (such as a rearward facing imaging sensor or camera 14a and/or a forwardly facing camera 14b at the front (or at the windshield) of the vehicle, and/or a sidewardly/rearwardly facing camera 14c, 14d at the sides of the vehicle), which capture images exterior of the vehicle, with the cameras having a lens for focusing images at or onto an imaging array or imaging plane of the camera (FIG. 1). The vision system 12 is operable to process image data captured by the cameras and may provide displayed images at a display device 16 for viewing by the driver of the vehicle. In the illustrated embodiment, the vehicle is towing a trailer 18 and the vision system 12 may include one or more cameras (or receives and processes image data captured by one or more cameras at the trailer), such as a rearward facing camera 20a at the rear of the trailer and sidewardly facing cameras 20b, 20c at the sides of the trailer. The system, responsive to processing of image data captured by the cameras 14a-d (and optionally cameras 20a-c), may be operable to display a bird's eye view or top down view of the vehicle and trailer to assists the driver in maneuvering the vehicle with the trailer, such as during a reversing maneuver of the vehicle and trailer. Optionally, the vision system or trailering assist system may process image data to detect objects, such as objects to the rear of the subject or equipped vehicle during a reversing maneuver, or such as approaching or following vehicles or vehicles at a side lane adjacent to the subject or equipped vehicle or the like.

The trailer angle viewing system or trailering assist system of the present invention may utilize aspects of the trailer angle detection systems described in International Publication No. WO 2012/103193, and/or U.S. patent applications, Ser. No. 14/102,981, filed Dec. 11, 2013, now U.S. Pat. No. 9,558,409, and/or Ser. No. 14/036,723, filed Sep. 25, 2013, now U.S. Pat. No. 9,446,713, which are hereby incorporated herein by reference in their entireties.

As discussed in U.S. patent applications, Ser. No. 14/102,981, filed Dec. 11, 2013, now U.S. Pat. No. 9,558,409, and/or Ser. No. 14/036,723, filed Sep. 25, 2013, now U.S. Pat. No. 9,446,713, which are hereby incorporated herein by reference in their entireties, the display system may provide a projection of the trailer's position during a reversing maneuver. The normal view of a backup camera on a trailer pulling vehicle is typically blocked by the trailer, and thus such a backup camera cannot provide visual backup assistance to the driver when the trailer is attached to the vehicle. However, the camera system of the present invention may be operable to detect the angle of the trailer longitudinal axis with respect to the pulling vehicle's longitudinal axis, and with the knowledge of the trailer dimensional characteristics (such as wheel position and distance from the vehicle and the like), the processor can calculate and project a trajectory or reversing path of the trailer in the form of graphic overlay on the camera display or video display (typically disposed in the vehicle, such as at or in or near an interior rearview mirror assembly of the vehicle) to indicate to the driver viewing the video display a path or trajectory of where the trailer is backing up to during the vehicle and trailer reversing maneuver. In addition, when the trailer pulling or towing vehicle is equipped with side view cameras, the added views provided by the side cameras (typically having fields of view directed generally rearwardly and sidewardly with respect to the direction of forward travel of the equipped vehicle) can provide additional scene information of the trailer to assist the driver of the vehicle (viewing the images at a video display of the vehicle) during a reversing or backing up maneuver. The calculated graphical trailer path can be overlaid to the side camera image to further assist the driver of the vehicle during a reversing or backing up maneuver.

Most drivers find it challenging to back up a trailer on their vehicle due to the dynamic interaction between the relative positions of the vehicle, trailer and front vehicle wheel angles. Most drivers use a trial and error method where they attempt to learn the results of the various stages of the maneuver by making short trial runs. The present invention provides a determination of the trailer angle (the angle of the longitudinal axis of the towed trailer relative to the longitudinal axis of the towing vehicle) and a prediction or estimation of the trailer angle, such as based on the vehicle dynamics and the vehicle and trailer parameters. The trailer angle detection and prediction system or trailering assist system is useful in assisting a driver in parking a trailer at a parking space.

Figure 2:
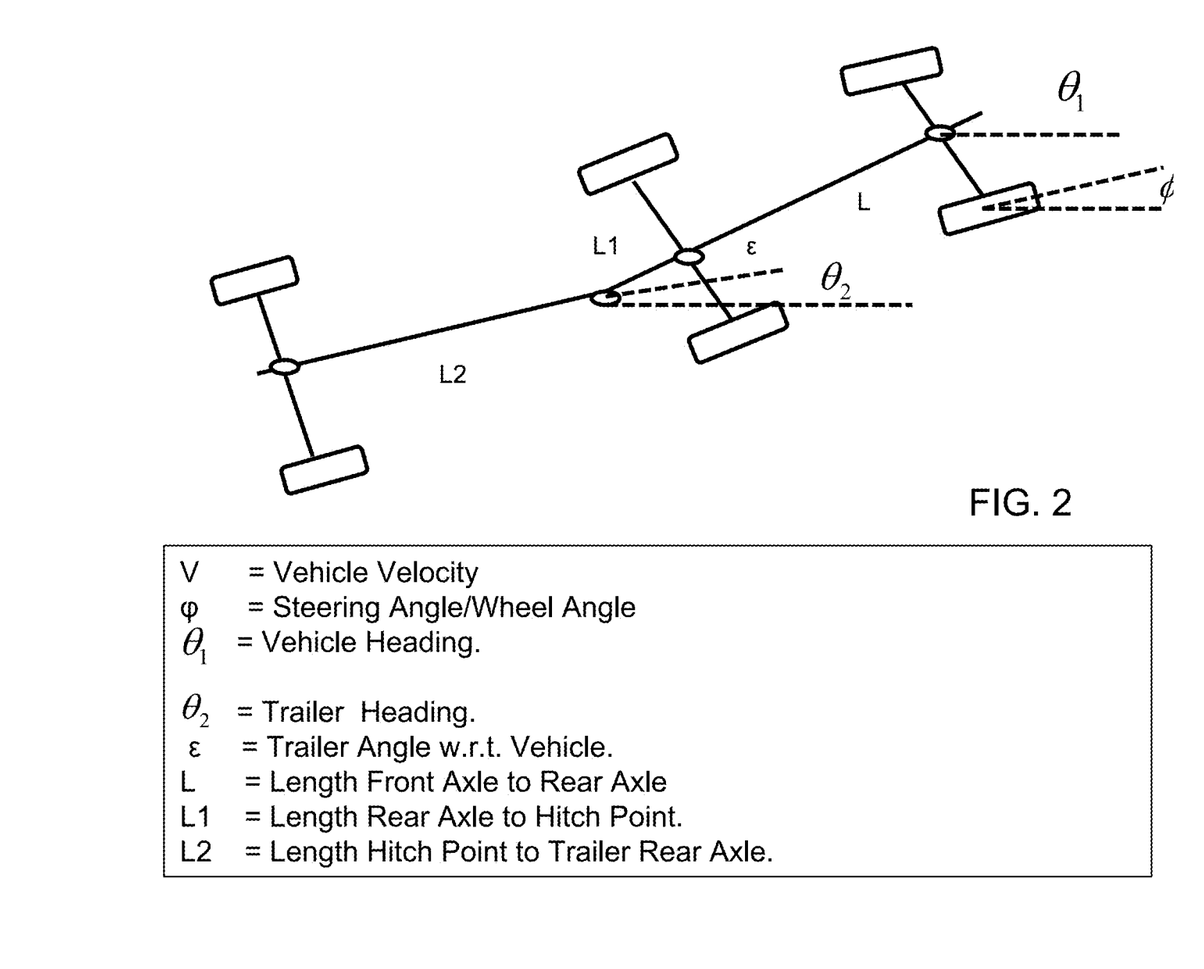
FIG. 2 is schematic of the vehicle and trailer of FIG. 1.
Figure 3:
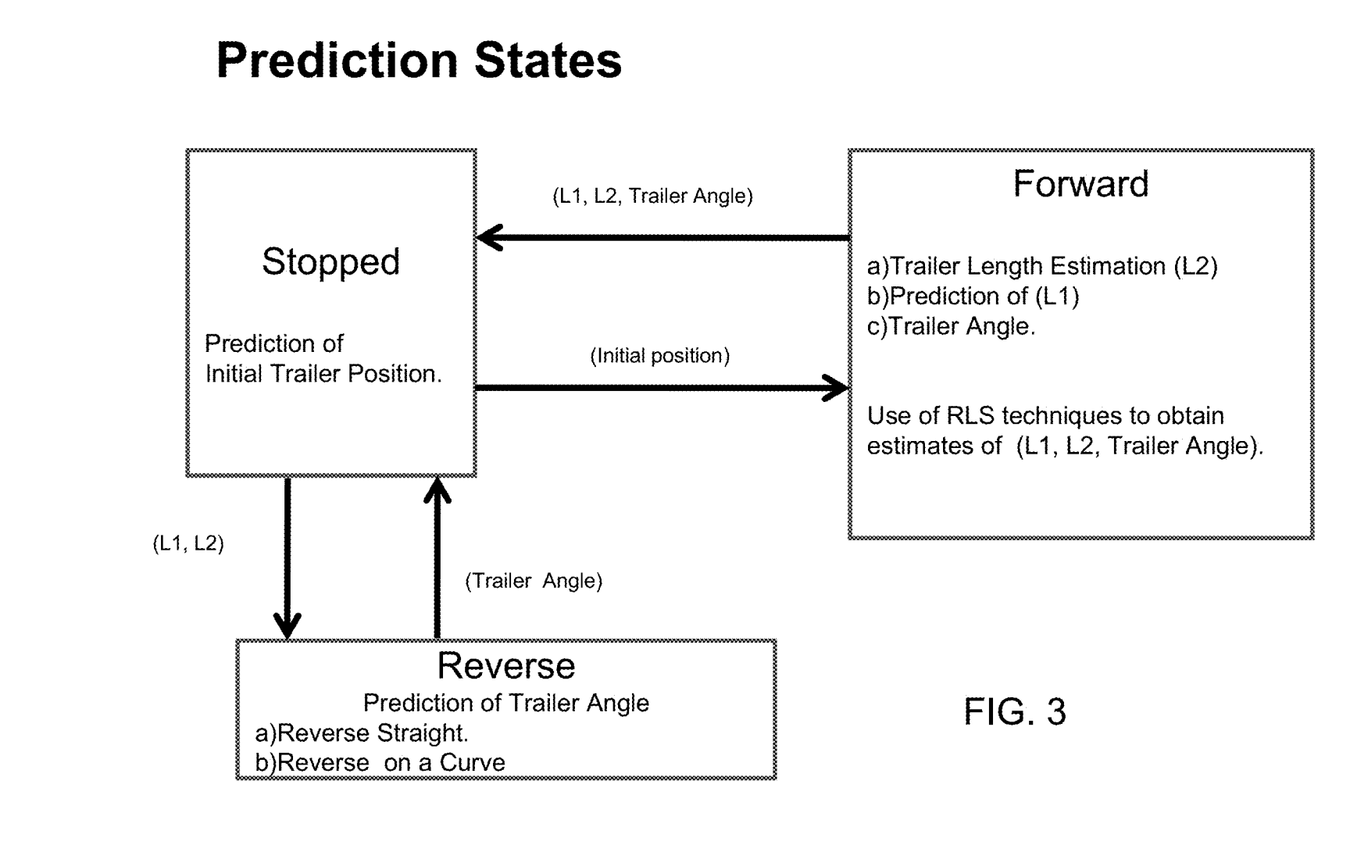
FIG. 3 is a block diagram of the prediction states of the trailer angle detection system of the present invention.

As shown in FIG. 2, various parameters of the vehicle and the trailer that is being towed by the vehicle can be measured or determined and/or input into the system of the present invention. The system of the present invention is operable to determine the trailer angle or predict the trailer angle when the vehicle is stopped and/or moving in a forward direction and/or moving in a rearward direction. The system may determine or estimate some of the parameters (such as the length or distance (L1) between the vehicle rear axle and he hitch point, the length or distance (L2) between the hitch point and the trailer axle and trailer angle relative to the vehicle), with less dependence on user inputs. For example, the system may estimate or predict some of the parameters while the vehicle is traveling forward, and may predict the initial trailer angle before reversing. The trailer angle prediction may be continuously updated while the trailer is reversing, whereby the trailer angle estimation may be used for self-parking of the vehicle-trailer combination.

Figure 4:
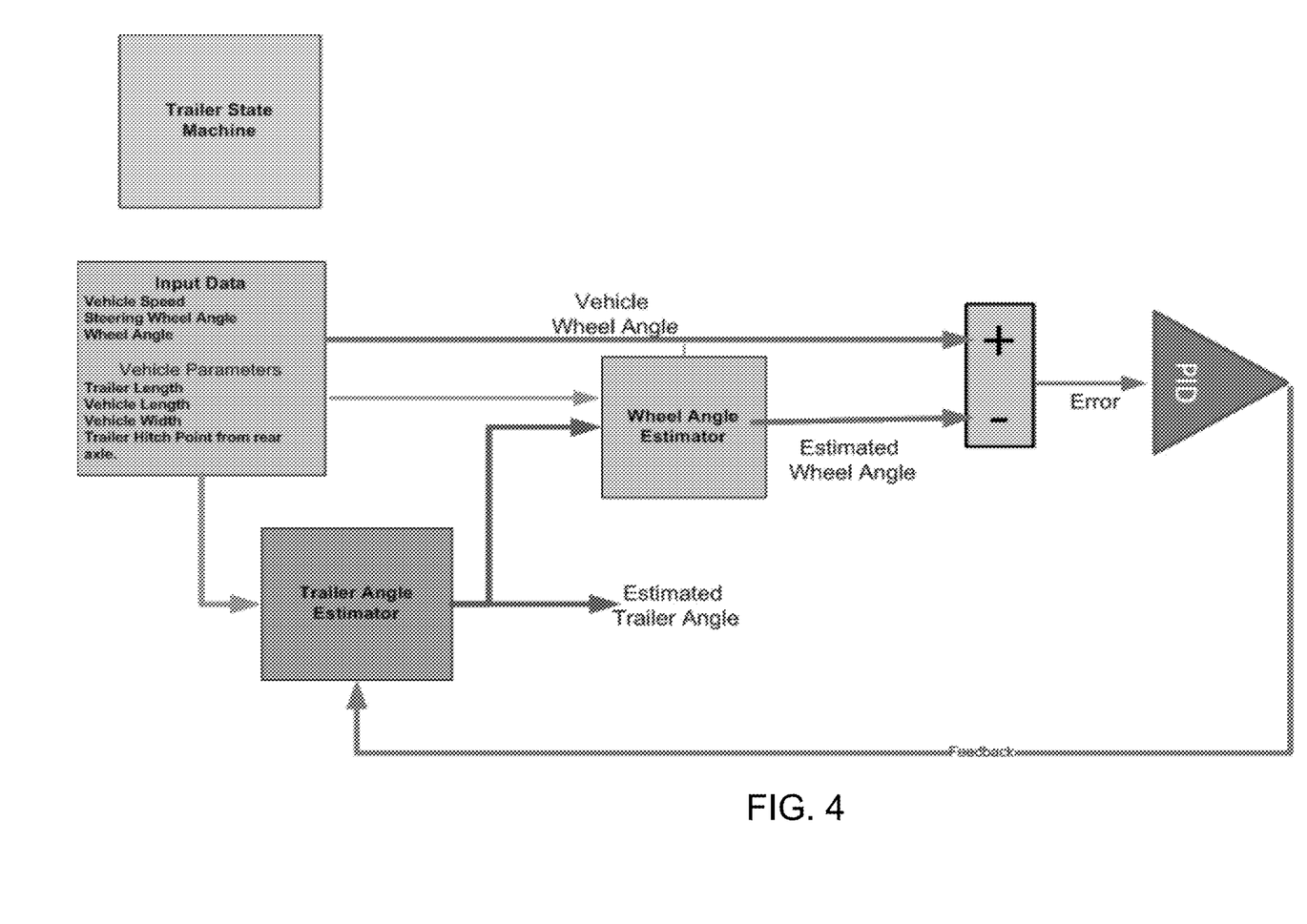
FIG. 4 is a block diagram of the trailer angle detection system of the present invention.

As shown in FIG. 4, the system may use some of the vehicle and/or trailer parameters (such as trailer length, vehicle length, vehicle width and distance between the rear axle of the vehicle and the trailer hitch point or point where trailer pivots relative to the towing vehicle) as inputs and, based on the inputs, the system may estimate the trailer angle (such as via a trailer angle estimator) and the vehicle wheel angle (such as via a wheel angle estimator), which is then compared to the input value or vehicle wheel angle to determine an error between the actual wheel angle (such as determined by a steering wheel angle or wheel angle sensor) and the estimated wheel angle. The estimation process of the trailer angle detection or prediction system or trailering assist system of the present invention thus uses the vehicle inputs and parameters to estimate the trailer angle relative to the towing vehicle, and estimates the trailer angle for the given driving condition and steering direction or steering angle.

For example, during a reversing maneuver of the vehicle, the system may determine an estimated trailer angle and, using the estimated trailer angle, may estimate the steering angle or wheel angle of the towing vehicle (based on the vehicle and trailer parameters and direction of travel and/or other inputs). The estimated wheel angle of the towing vehicle is compared to the determined or measured wheel angle (such as determined by or received from a vehicle status system or sensor and vehicle network bus or the like). The error or difference between the estimated wheel angle and the determined or actual wheel angle is used to modify the estimated trailer angle in subsequent determinations. When the error is within a threshold level, the system may continue to monitor the angles as the driver of the vehicle continues the driving maneuver. When the determined error is at or above a threshold level or amount, the system may alert the driver of the vehicle (such as via a visual or audible alert or the like) that the trailer angle may not be at an expected angle for that steering angle, so that the driver can check to make sure that the driving maneuver is guiding (pushing or pulling) the trailer in the right direction towards the targeted location. Optionally, during a reversing maneuver where the system displays a graphic overlay to represent the trailer in the displayed images, the system may utilize the wheel angle error determination to adjust the graphic overlay angle relative to the rear of the vehicle. The system may determine the error between estimated and actual wheel angles during both forward and rearward driving maneuvers.

The estimated trailer angle, along with the vehicle parameters, is used to estimate the wheel angle of the vehicle for that estimated trailer angle (and that particular direction of travel of the vehicle and trailer). The difference between the actual or determined wheel angle (such as measured or determined by a sensor or the like of the vehicle) and the estimated wheel angle is the error or offset that needs to be minimized by the driver and the system. The output of the PID controller is used as a feedback to update the parameters used to compute the trailer angle estimate.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent applications, Ser. No. 14/359,341, filed May 20, 2014, now U.S. Pat. No. 10,071,687; Ser. No. 14/359,340, filed May 20, 2014, now U.S. Pat. No. 10,099,614; Ser. No. 14/282,029, filed May 20, 2014, now U.S. Pat. No. 9,205,776; Ser. No. 14/282,028, filed May 20, 2014, now U.S. Pat. No. 9,563,951; Ser. No. 14/358,232, filed May 15, 2014, now U.S. Pat. No. 9,491,451; Ser. No. 14/272,834, filed May 8, 2014, now U.S. Pat. No. 9,280,202; Ser. No. 14/356,330, filed May 5, 2014, now U.S. Pat. No. 9,604,581; Ser. No. 14/269,788, filed May 5, 2014, now U.S. Pat. No. 9,508,014; Ser. No. 14/268,169, filed May 2, 2014, and published on Nov. 6, 2014 as U.S. Publication No. US-2014-0327772; Ser. No. 14/264,443, filed Apr. 29, 2014, now U.S. Pat. No. 10,232,797; Ser. No. 14/354,675, filed Apr. 28, 2014, now U.S. Pat. No. 9,580,013; Ser. No. 14/248,602, filed Apr. 9, 2014, now U.S. Pat. No. 9,327,693; Ser. No. 14/242,038, filed Apr. 1, 2014, now U.S. Pat. No. 9,487,159; Ser. No. 14/229,061, filed Mar. 28, 2014, now U.S. Pat. No. 10,027,930; Ser. No. 14/343,937, filed Mar. 10, 2014, now U.S. Pat. No. 9,681,062; Ser. No. 14/343,936, filed Mar. 10, 2014, and published on Aug. 7, 2014 as U.S. Publication No. US-2014-0218535; Ser. No. 14/195,135, filed Mar. 3, 2014, now U.S. Pat. No. 9,688,200; Ser. No. 14/195,136, filed Mar. 3, 2014, now U.S. Pat. No. 10,057,544; Ser. No. 14/191,512, filed Feb. 27, 2014, now U.S. Pat. No. 10,179,543; Ser. No. 14/183,613, filed Feb. 19, 2014, now U.S. Pat. No. 9,445,057; Ser. No. 14/169,329, filed Jan. 31, 2014, and published Aug. 7, 2014 as U.S. Publication No. US-2014-0218529; Ser. No. 14/169,328, filed Jan. 31, 2014, now U.S. Pat. No. 9,092,986; Ser. No. 14/163,325, filed Jan. 24, 2014, and published Jul. 31, 2014 as U.S. Publication No. US-2014-02110009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013, now U.S. Pat. No. 9,558,409; Ser. No. 14/102,980, filed Dec. 11, 2013, and published Jun. 19, 2014 as U.S. Publication No. US-2014-0168437; Ser. No. 14/098,817, filed Dec. 6, 2013, and published Jun. 19, 2014 as U.S. Publication No. 2014/0168415; Ser. No. 14/097,581, filed Dec. 5, 2013, now U.S. Pat. No. 9,481,301; Ser. No. 14/093,981, filed Dec. 2, 2013, now U.S. Pat. No. 8,917,169; Ser. No. 14/093,980, filed Dec. 2, 2013, now U.S. Pat. No. 10,025,994; Ser. No. 14/082,573, filed Nov. 18, 2013, now U.S. Pat. No. 9,743,002; Ser. No. 14/082,574, filed Nov. 18, 2013, now U.S. Pat. No. 9,307,640; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,963; Ser. No. 14/052,945, filed Oct. 14, 2013, now U.S. Pat. No. 9,707,896; Ser. No. 14/046,174, filed Oct. 4, 2013, now U.S. Pat. No. 9,723,272; Ser. No. 14/016,790, filed Oct. 3, 2013, now U.S. Pat. No. 9,761,142; Ser. No. 14/036,723, filed Sep. 25, 2013, now U.S. Pat. No. 9,446,713; Ser. No. 14/016,790, filed Sep. 3, 2013, now U.S. Pat. No. 9,761,142; Ser. No. 14/001,272, filed Aug. 23, 2013, now U.S. Pat. No. 9,233,641; Ser. No. 13/970,868, filed Aug. 20, 2013, now U.S. Pat. No. 9,365,162; Ser. No. 13/964,134, filed Aug. 12, 2013, now U.S. Pat. No. 9,340,227; Ser. No. 13/942,758, filed Jul. 16, 2013, and published Jan. 23, 2014 as U.S. Publication No. US-2014-0025240; Ser. No. 13/942,753, filed Jul. 16, 2013, and published on Jan. 30, 2014 as U.S. Publication No. US-2014-0028852; Ser. No. 13/927,680, filed Jun. 26, 2013, and published on Jan. 2, 2014 as U.S. Publication No. US-2014-0005907; Ser. No. 13/916,051, filed Jun. 12, 2013, now U.S. Pat. No. 9,077,098; Ser. No. 13/894,870, filed May 15, 2013, now U.S. Pat. No. 10,089,537; Ser. No. 13/887,724, filed May 6, 2013, now U.S. Pat. No. 9,670,895; Ser. No. 13/852,190, filed Mar. 28, 2013, now U.S. Pat. No. 10,457,209; Ser. No. 13/851,378, filed Mar. 27, 2013, now U.S. Pat. No. 9,319,637; Ser. No. 13/848,796, filed Mar. 22, 2012, now U.S. Pat. No. 10,609,335; Ser. No. 13/847,815, filed Mar. 20, 2013, and published Oct. 21, 2013 as U.S. Publication No. US-2013-0286193; Ser. No. 13/800,697, filed Mar. 13, 2013, now U.S. Pat. No. 10,182,228; Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013, and published on Aug. 22, 2013 as U.S. Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574 and/or Ser. No. 13/534,657, filed Jun. 27, 2012, and published Jan. 3, 2013 as U.S. Publication No. US-2013-0002873, and/or U.S. provisional applications, Ser. No. 62/001,796, filed May 22, 2014; Ser. No. 62/001,796, filed May 22, 2014; Ser. No. 61/993,736, filed May 15, 2014; Ser. 61/991,810, filed May 12, 2014; Ser. No. 61/991,809, filed May 12, 2014; Ser. No. 61/990,927, filed May 9, 2014; Ser. No. 61/989,652, filed May 7, 2014; Ser. No. 61/981,938, filed Apr. 21, 2014; Ser. No. 61/981,937, filed Apr. 21, 2014; Ser. No. 61/977,941, filed Apr. 10, 2014; Ser. No. 61/977,940. filed Apr. 10, 2014; Ser. No. 61/977,929, filed Apr. 10, 2014; Ser. No. 61/977,928, filed Apr. 10, 2014; Ser. No. 61/973,922, filed Apr. 2, 2014; Ser. No. 61/972,708, filed Mar. 31, 2014; Ser. No. 61/972,707, filed Mar. 31, 2014; Ser. No. 61/969,474, filed Mar. 24, 2014; Ser. No. 61/955,831, filed Mar. 20, 2014; Ser. No. 61/953,970, filed Mar. 17, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/941,568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013 and/or Ser. No. 61/830,377, filed Jun. 3, 2013; which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, and/or U.S. patent application Ser. No. 13/534,657, filed Jun. 27, 2012, and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149 and/or U.S. Publication No. US-2006-0061008 and/or U.S. patent application Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A trailering assist system for a vehicle, said trailering assist system comprising:

a camera disposed at a vehicle equipped with said trailering assist system;

wherein said camera comprises a two dimensional array of photosensing elements;

wherein said camera has a field of view rearward of the equipped vehicle that encompasses a trailer that is being towed by the equipped vehicle, and wherein said camera is operable to capture image data;

a control;

said control comprising an image processor operable to process image data captured by said camera;

wherein said control receives an input of vehicle parameters;

wherein, responsive to receipt of said input of vehicle parameters and to processing of captured image data by said image processor, said trailering assist system is operable to determine an estimated trailer angle and an estimated steering wheel angle of the equipped vehicle;

wherein the estimated trailer angle comprises an estimation of an angle of a longitudinal axis of the trailer relative to a longitudinal axis of the equipped vehicle;

wherein said control compares said estimated vehicle steering wheel angle to an actual steering wheel angle of the equipped vehicle to determine a steering wheel angle error value, and wherein said steering wheel angle error value is derived from the difference between the estimated steering wheel angle and the actual steering wheel angle;

wherein said steering wheel angle error value is used to modify the estimated trailer angle in subsequent determinations of the estimated trailer angle;

wherein, while said steering wheel angle error value is within a threshold range, said trailering assist system continues to determine steering wheel angle error values in making subsequent determinations of the estimated trailer angle as the driver of the vehicle continues a driving maneuver; and wherein said control is operable to generate an output responsive to said steering wheel angle error value being at or above a threshold level.

2. The trailering assist system of claim 1, wherein said control generates an alert to a driver of the equipped vehicle when said steering wheel angle error value is at or above the threshold level.

3. The trailering assist system of claim 2, wherein said alert comprises at least one of an audible alert and a visual alert.

4. The trailering assist system of claim 1, comprising a video display screen disposed in the equipped vehicle for viewing by a driver of the equipped vehicle, wherein said video display screen displays images of the scene rearward of the equipped vehicle to assist the driver during a reversing maneuver of the equipped vehicle.

5. The trailering assist system of claim 4, wherein said video display screen displays a graphic overlay representative of the trailer to assist the driver during the reversing maneuver of the equipped vehicle.

6. The trailering assist system of claim 5, wherein said control is operable to alert the driver of the equipped vehicle when said steering wheel angle error value is at or above the threshold level to assist the driver in adjusting the actual steering angle of the equipped vehicle to guide the trailer towards a target location.

7. The trailering assist system of claim 5, wherein said video display screen is operable to display information for viewing by the driver of the equipped vehicle to assist the driver in driving the equipped vehicle with the trailer.

8. The trailering assist system of claim 7, wherein said video display screen is operable to display a predicted path that the trailer and equipped vehicle are traveling along responsive at least in part to the estimated trailer angle.

9. The trailering assist system of claim 8, wherein said video display screen is operable to display an appropriate path for the equipped vehicle and trailer to follow to reverse the trailer towards a target location.

10. The trailering assist system of claim 1, wherein said input of vehicle parameters includes input of at least some of (i) speed of the equipped vehicle, (ii) measured steering wheel angle of the equipped vehicle, (iii) trailer length of the towed trailer, (iv) vehicle length of the equipped vehicle, (v) vehicle width of the equipped vehicle and (vi) trailer hitch point from a rear axle of the equipped vehicle.

11. The trailering assist system of claim 1, wherein said control generates an alert signal to alert the driver of a potentially hazardous situation while the equipped vehicle is reversing with the trailer.

12. A trailering assist system for a vehicle, said trailering assist system comprising:

a camera disposed at a vehicle equipped with said trailering assist system;

wherein said camera comprises a two dimensional array of photosensing elements;

wherein said camera has a field of view rearward of the equipped vehicle that encompasses a trailer that is being towed by the equipped vehicle, and wherein said camera is operable to capture image data;

a control;

said control comprising an image processor operable to process image data captured by said camera;

wherein said control receives an input of vehicle parameters;

wherein said input of vehicle parameters includes input of at least some of (i) speed of the equipped vehicle, (ii) measured steering wheel angle of the equipped vehicle, (iii) trailer length of the towed trailer, (iv) vehicle length of the equipped vehicle, (v) vehicle width of the equipped vehicle and (vi) trailer hitch point from a rear axle of the equipped vehicle;

wherein, responsive to receipt of said input of vehicle parameters and to processing of captured image data by said image processor, said trailering assist system is operable to determine an estimated trailer angle and an estimated steering wheel angle of the equipped vehicle;

wherein the estimated trailer angle comprises an estimation of an angle of a longitudinal axis of the trailer relative to a longitudinal axis of the equipped vehicle;

wherein said control compares said estimated vehicle steering wheel angle to an actual steering wheel angle of the equipped vehicle to determine a steering wheel angle error value, and wherein said steering wheel angle error value is derived from the difference between the estimated steering wheel angle and the actual steering wheel angle;

wherein said steering wheel angle error value is used to modify the estimated trailer angle in subsequent determinations of the estimated trailer angle;

a video display screen disposed in the equipped vehicle for viewing by a driver of the equipped vehicle, wherein said video display screen displays images of the scene rearward of the equipped vehicle to assist the driver during a reversing maneuver of the equipped vehicle;

wherein, while said steering wheel angle error value is within a threshold range, said trailering assist system continues to determine steering wheel angle error values in making subsequent determinations of the estimated trailer angle as the driver of the vehicle continues the reversing maneuver; and wherein said control is operable to generate an alert to a driver of the equipped vehicle responsive to said steering wheel angle error value being at or above a threshold level.

13. The trailering assist system of claim 12, wherein said alert comprises at least one of an audible alert and a visual alert.

14. The trailering assist system of claim 12, wherein said video display screen displays a graphic overlay representative of the trailer to assist the driver during the reversing maneuver of the equipped vehicle.

15. The trailering assist system of claim 12, wherein said control is operable to alert the driver of the equipped vehicle when said steering wheel angle error value is at or above the threshold level to assist the driver in adjusting the actual steering angle of the equipped vehicle to guide the trailer towards a target location during the reversing maneuver of the equipped vehicle.

16. The trailering assist system of claim 12, wherein said video display screen is operable to display information for viewing by the driver of the equipped vehicle to assist the driver in driving the equipped vehicle with the trailer, and wherein said video display screen is operable to display a predicted path that the trailer and equipped vehicle are traveling along responsive at least in part to the estimated trailer angle.

17. The trailering assist system of claim 16, wherein said video display screen is operable to display an appropriate path for the equipped vehicle and trailer to follow to reverse the trailer towards a target location.

18. A trailering assist system for a vehicle, said trailering assist system comprising:

a camera disposed at a vehicle equipped with said trailering assist system;

wherein said camera comprises a two dimensional array of photosensing elements;

wherein said camera has a field of view rearward of the equipped vehicle that encompasses a trailer that is being towed by the equipped vehicle, and wherein said camera is operable to capture image data;

a control;

said control comprising an image processor operable to process image data captured by said camera;

wherein said control receives an input of vehicle parameters;

wherein said input of vehicle parameters includes input of at least some of (i) speed of the equipped vehicle, (ii) measured steering wheel angle of the equipped vehicle, (iii) trailer length of the towed trailer, (iv) vehicle length of the equipped vehicle, (v) vehicle width of the equipped vehicle and (vi) trailer hitch point from a rear axle of the equipped vehicle;

wherein, responsive to receipt of said input of vehicle parameters and to processing of captured image data by said image processor, said trailering assist system is operable to determine an estimated trailer angle and an estimated steering wheel angle of the equipped vehicle;

wherein the estimated trailer angle comprises an estimation of an angle of a longitudinal axis of the trailer relative to a longitudinal axis of the equipped vehicle;

wherein said control compares said estimated vehicle steering wheel angle to an actual steering wheel angle of the equipped vehicle to determine a steering wheel angle error value, and wherein said steering wheel angle error value is derived from the difference between the estimated steering wheel angle and the actual steering wheel angle;

wherein said steering wheel angle error value is used to modify the estimated trailer angle in subsequent determinations of the estimated trailer angle;

wherein, while said steering wheel angle error value is within a threshold range, said trailering assist system continues to determine steering wheel angle error values in making subsequent determinations of the estimated trailer angle as the driver of the vehicle continues a driving maneuver;

wherein said control is operable to generate an output responsive to said steering wheel angle error value being at or above a threshold level;

a video display screen disposed in the equipped vehicle for viewing by a driver of the equipped vehicle, wherein said video display screen displays images of the scene rearward of the equipped vehicle to assist the driver during a reversing maneuver of the equipped vehicle;

wherein said video display screen is operable to display a predicted path that the trailer and equipped vehicle are traveling along responsive at least in part to the estimated trailer angle; and wherein said control is operable to alert the driver of the equipped vehicle when said steering wheel angle error value is at or above the threshold level to assist the driver in adjusting the actual steering angle of the equipped vehicle to guide the trailer towards a target location.

19. The trailering assist system of claim 18, wherein said control generates an alert to a driver of the equipped vehicle when said steering wheel angle error value is at or above the threshold level, and wherein said alert comprises at least one of an audible alert and a visual alert.

20. The trailering assist system of claim 18, wherein said video display screen is operable to display an appropriate path for the equipped vehicle and trailer to follow to reverse the trailer towards a target location during the reversing maneuver of the equipped vehicle.

* * * * *